June 22, 1943.    C. L. FELDTKELLER    2,322,351
TRIMMING MECHANISM FOR GRID PLATES
Filed April 28, 1941    3 Sheets-Sheet 3

Inventor
CARL L. FELDTKELLER

Patented June 22, 1943

2,322,351

UNITED STATES PATENT OFFICE 2,322,351

TRIMMING MECHANISM FOR GRID PLATES

Carl L. Feldtkeller, Milwaukee, Wis.

Application April 28, 1941, Serial No. 390,709

4 Claims. (Cl. 164—20)

This invention relates generally to improvements in the manufacture of storage battery grid plates.

The grids employed in storage batteries and carrying the electro-chemical material are at present initially cast in units of two in what are called plates or grid plates. These plates, for reasons of proper mold filling and metal distribution, have a marginal frame which must be trimmed off leaving the two grids connected but sized as to length and width for further operations. In the production type of manufacture these trimmed plates are sized as to thickness, pasted or filled with the active material and bonded before the individual grids are finally separated, all of these operations and the feed or conveyance between the machines performing the operations being automatic, so far as possible, in the interest of speed and efficiency.

The casting operations may be carried out in any of the high speed machines well known in the art and such as represented by United States Patents No. 1,747,552, issued February 18, 1930; No. 1,811,143, issued June 23, 1931; Nos. 1,843,774, 1,843,775, 1,843,776 and 1,843,777, all issued February 2, 1932; No. 1,959,484, issued May 22, 1934; No. 2,028,790, issued January 28, 1936, and No. 2,194,092, issued March 19, 1940. The sizing, as to thickness, may be carried out by a machine such as shown in United States Patent No. 2,098,808, issued November 9, 1937. The pasting of the plates with the active material may be carried out by machines such as shown in United States Patents Nos. 2,081,943 and 2,081,944, issued June 1, 1937, and the bonding of the plates after pasting may be done in a machine such as shown in United States Patent No. 2,195,723, issued April 2, 1940.

My present invention relates particularly to a machine for carrying out the operation of marginally trimming the plates after they are cast and before they are sized and pasted and has as its chief object the provision of a machine for this purpose which will accurately cut the plates to desired size, convey the trimmed plates onward for further operation, return the waste trimmings to the casting equipment for remelting, and perform all such operations rapidly and with a minimum of attention. Another object is to provide an automatic plate feeding means, conveyor system, and pickup system for trimmings, all arranged in cooperating connection with a punch press having its punch and die designed to trim the plates to desired size and shape.

These and other more detailed and specific objects will be disclosed in the course of the following specification, reference being had to the accompanying drawings, in which—

Figure 3:
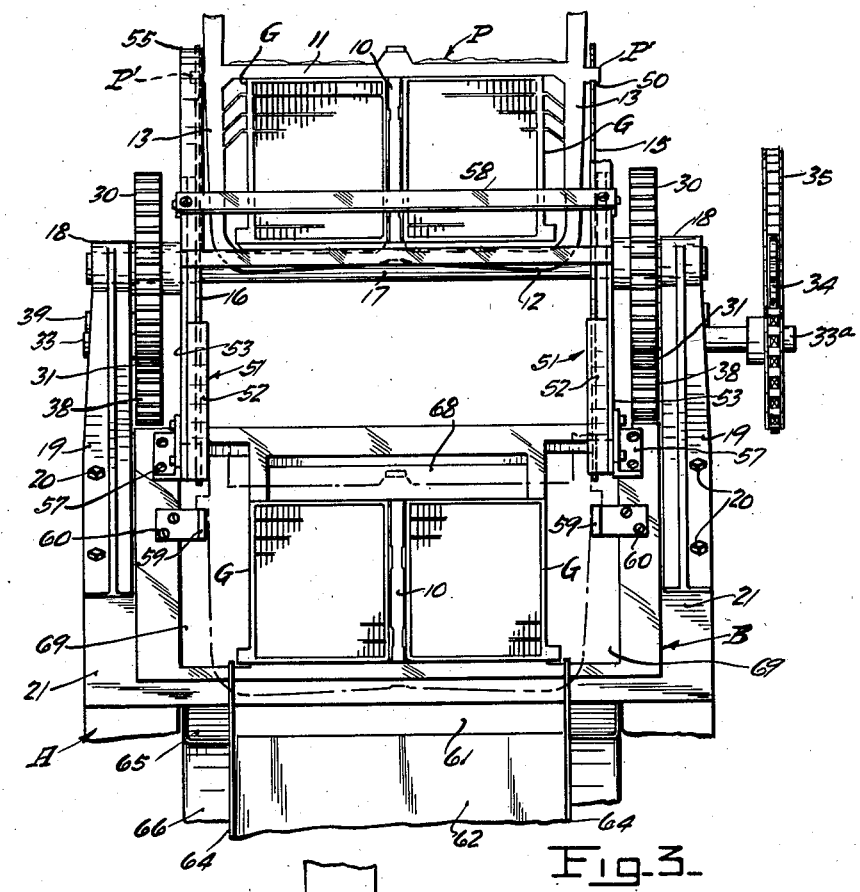
Fig. 3 is a view taken substantially along the line 3—3 in Fig. 2 viewing the plate feeding equipment in end elevation and the die shoe in plan.

Referring now more particularly to the drawings, the machine or mechanism of my invention is seen to include as a cooperating part a punch press designated generally at A having the die B and punch C shaped and designed to perform the necessary trimming operation on the rough cast plates P. Such plates include two grids G having the usual reticulated centers for receiving the active paste and these grids are joined at the center 10 and are cast within a plate frame having the top 11, bottom 12 and sides 13. To trim the plates these marginal portions must be severed leaving the two center connected grids in the trimmed plate, as seen in Fig. 3, and the die and punch B and C are accordingly shaped to properly carry out this operation as will be clearly evident.

The press A is adjusted in the base frame D so that the die and shoe incline substantially at an angle of forty-five degrees to the horizontal with the outer or forward edge of the die uppermost. The punch C is of course operated by the usual crankshaft E and as here shown, an electric motor F drives this shaft through belt connection H to the flywheel I. The lower portion of the press A is of course, open beneath the die B and out through the rear as designated at J.

Figure 1:
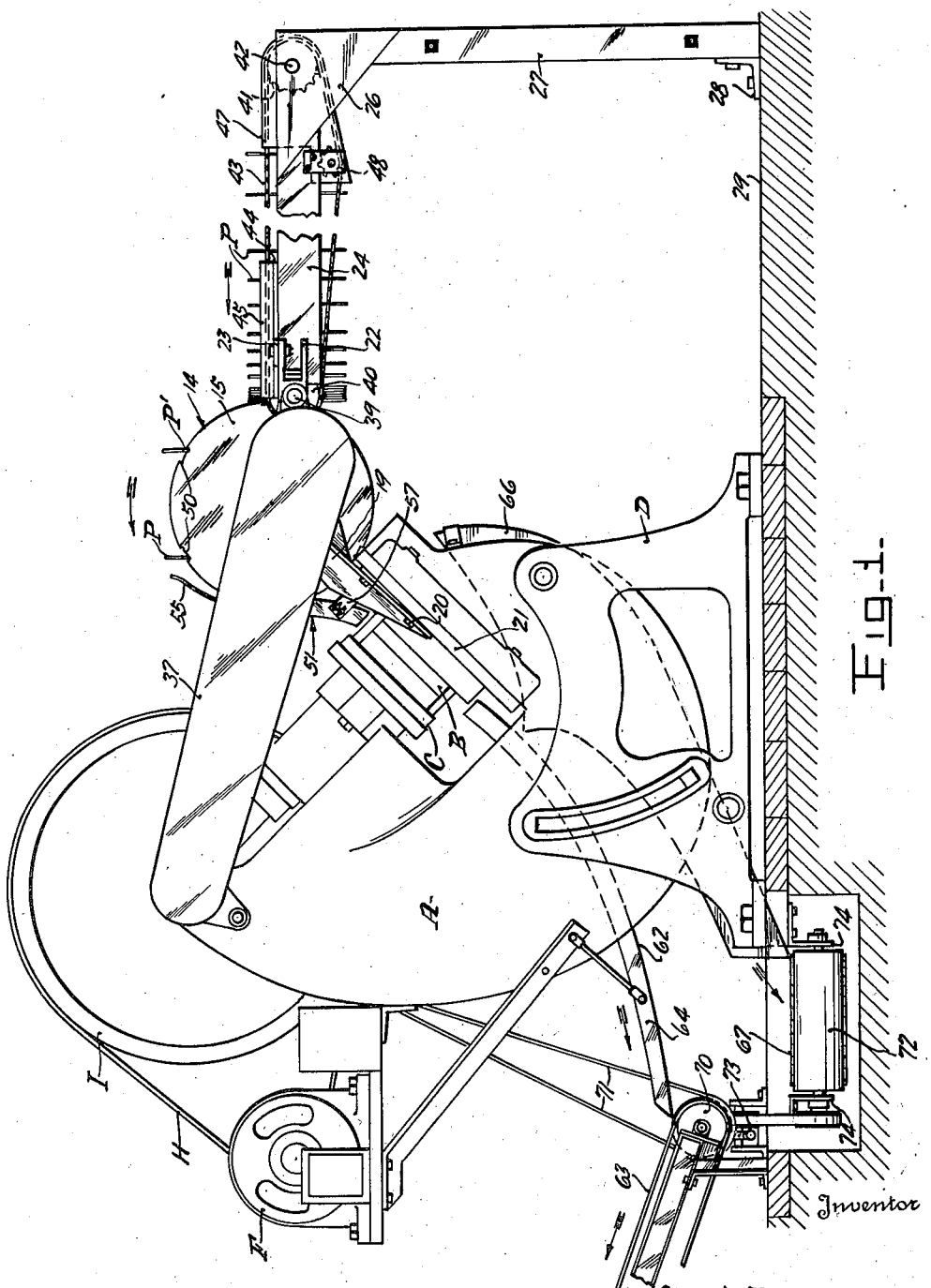
Fig. 1 is a side elevation of my trimming machine or mechanism with certain parts broken away and in vertical section.

For feeding the rough cast plates P to the punch press A, I employ the mechanism now to be described. As a main operating part of this mechanism, I provide a reel-like carrier or feed device designated generally at 14 consisting of two circular disks 15—16 secured in spaced relation upon an axle shaft 17 which is journaled at its ends through bearings 18 formed in two mounting brackets or arms 19. Said brackets are secured at 20 to the die bed 21 of the press A and extend upwardly and forwardly therefrom to support the disks 15—16 just forwardly of, and above, the die B. The brackets extend out forwardly beyond the disks 15—16 and turn downwardly and terminate in ends 22 which support inwardly turned hanger bars 23 to which side channels 24 are secured at 25. These channels 24 extend forwardly and horizontally from the press for a considerable length and at outer ends are secured by gusset plates 26 to upright end posts 27, bolted or secured by transverse angles 28 to the floor 29. The entire assembly of brackets 19, channels 24 and end posts 27 thus form a rigid frame or extension from the press as will be clearly evident in Fig. 1.

At each end, inwardly of the bearings 18, the shaft 17 carries rigidly mounted gears 30 which mesh with drive pinions 31 secured on short stub shafts 33 journaled in the brackets 19. One of said stub shafts 33 is extended outwardly as represented at 33ª and carries a sprocket 34 which is connected by a sprocket drive chain 35 with a sprocket 36 secured at the corresponding end of the crankshaft E, said sprockets and chain being conventionally enclosed and protected by a guard 37. When thus connected, the shaft 17, and disks 15—16 will of course be rotated in synchronism with the crankshaft E of the press A and in the direction indicated by the arrows.

The drive pinions 31 also mesh with gears 38 secured to short sprocket shafts 39 journaled near the forward, outer ends of the brackets 19 to drive these shafts also in synchronism with the disks 15—16 and punch press. At inner ends the sprocket shafts 39 carry rigidly affixed sprockets 40 which just clear the outer sides and forward edge portions of the disks 15—16 and which are disposed just within the vertical plane of the frame channels 24. Similar sprockets 41 are mounted on a shaft 42 near the forward ends of the channels and connecting the respective sprockets 40—41 on each side are conveyor sprocket chains 43 which travel on their upper spans toward the disks 15—16, as indicated in the drawings.

Figure 4:
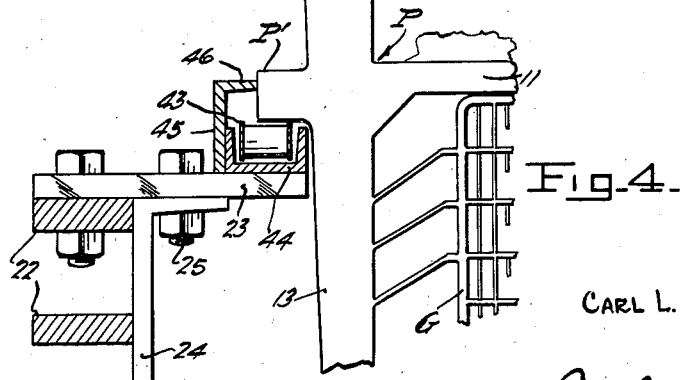
Fig. 4 is an enlarged vertical section through one side portion of the feed conveyor and frame and showing a fragment of a rough or cast plate.

Adjacent the disks 15—16 the upper spans of the chains 43 run through upwardly opening channels 44 secured to the hanger bars 23 and which serve to support these portions of the chain against downward displacement by the weight of the plates P supported by the chains. Mounted outwardly alongside each channel 44 is a guide member 45 having a lip or edge 46 spaced above and slightly outward of the chain as best seen in Fig. 4. Guards 47 partially enclose the forward sprockets 41 and adjacent portions of the sprocket chains 43, and idlers 48 are provided to keep the chains taut.

The rough cast plates P have laterally extending lugs P¹ near each upper corner and the sprocket chains 43 are so spaced apart that the plates may depend therebetween and hang by the lugs P¹ on the links of the chain. Thus when placed on the chains near their forward ends, by hand or otherwise, the plates P will be carried back by the chains toward the disks 15—16 against which the lugs P¹ will come to rest halting the travel movement so that the plates will pack against each other, side by side against the disks. The guide members 45 will just clear the ends of the lugs P¹ (Fig. 4) to prevent endwise movement of the plates.

The forward edges of the disks 15—16, against which the plates P¹ come to rest by movement of the chains 43, move upwardly and rearwardly as the disks rotate and notches 50 (here shown as six in number) are provided in spaced relation around the margins of the disks. These notches 50 are of such shape and depth that they will just hook or engage the lugs P¹ of the plate P next to the disks and will carry this plate upward and rearward over and around the shaft 17. Of course as each notch 50 comes around to the front it will pick up one plate so that the action is continuous so long as the disks and conveyor chains operate. The disks 15—16 are so spaced that the plates P, hanging from their lugs P¹ in the notches 50, may swing clear and hang in upright positions of their own weight.

Figure 2:
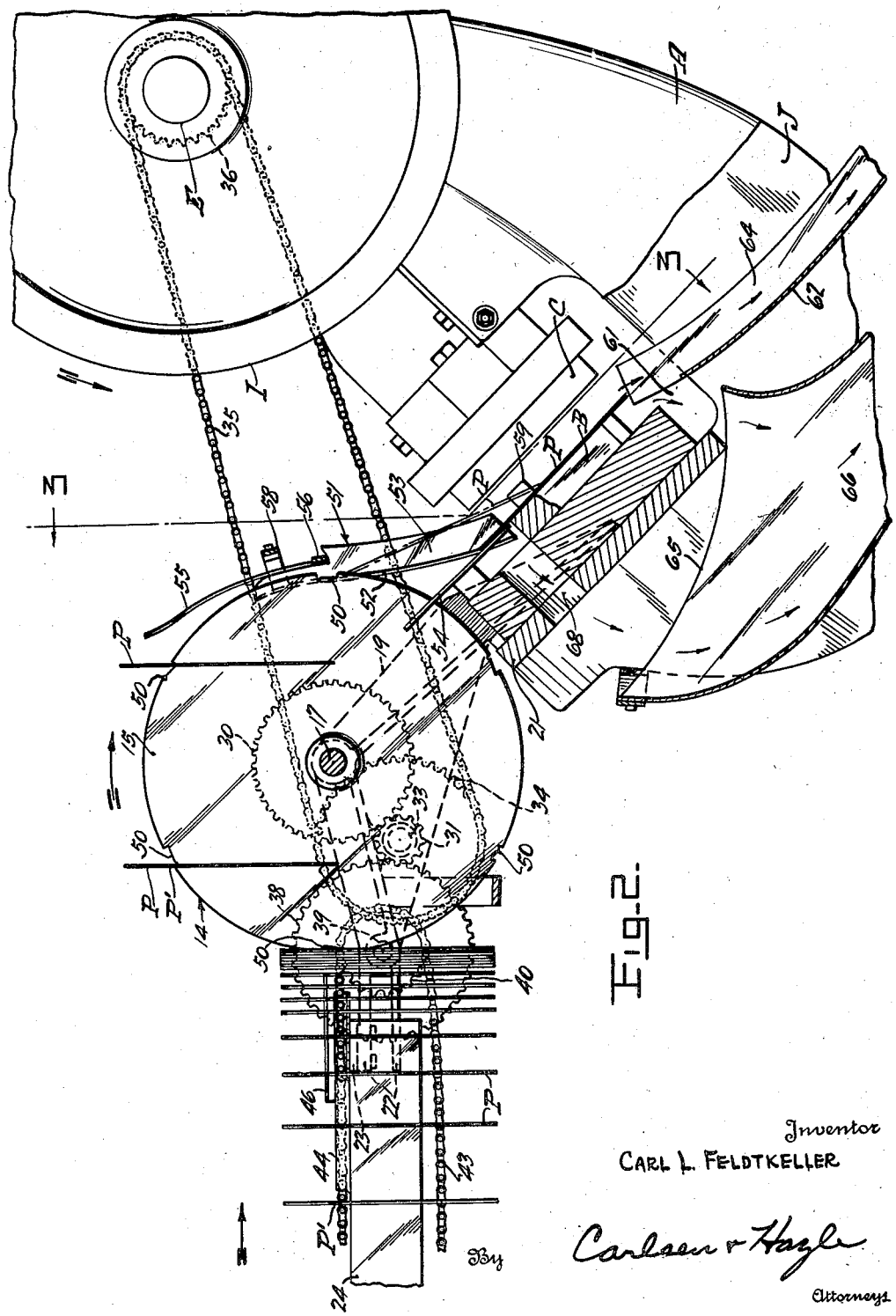
Fig. 2 is an enlarged fragmentary view looking at the opposite side of the machine and with plate feeding and punching parts shown in vertical section.

To direct and detach the plates from the descending rear sides of the disks 15—16, I provide guides 51 having guide strips 52 which extend from points within or forwardly of said rear sides downwardly and rearwardly to a point immediately forward of the die B. Side flanges 53 on these strips 52 prevent endwise displacement of the plates and the strips are so located that, as the lugs P¹ in each plate move downwardly in the notches 50 past a point about in horizontal alignment (Fig. 2) with the axes of the disks, the lugs will strike the strips and be guided thereby out of engagement with the notches. The lower edge of the plate, as this action takes place, contacts inclined slides 54 mounted on the die and is guided thereby downwardly and rearwardly causing the plates to fall flat upon the die face. The necessary rearward swinging of the lower edge of the plate is aided by upwardly and forwardly extended guide fingers 55 secured at 56 to the flanges 53 and which are arcuated to engage the upper edges of the plate while the plate is still in the notches. The guides 51 are adjustably supported by brackets 57 on the die and are braced by a cross bar 58 near upper ends.

As the plates thus freed from the disks move over the inclined die face, of their own weight, due to the inclination of the die, the lugs P¹ contact stops 59 secured at 60 to the die thus positively locating the plates in desired position.

The synchronization between the press crankshaft E and disks 15—16 is such that as each plate thus comes to rest upon the die, the punch C will be pressed down to trim off the margins of the plate and thus the operation after the plates are placed on the conveyor chains 43 is entirely automatic, and may of course be carried out very rapidly.

As the pairs of grids G are punched or trimmed from each rough cast plate P, the trimmed plates, now free from the lugs P¹ of course, slide off the lower rear edge of the die B and, spanning the space 61 (Figs. 2 and 3) thereat, slide upon a chute 62 which leads them downwardly through the open space J to a point over a belt conveyor 63 upon which they are carried clear and by which they are conveyed on to other machinery for further treatment. The chute 62 has sides 64 and the space 61 aforesaid, permits the trimmed off lower edge 12 of each plate P, to drop down into the open mouth 65 of a waste spout 66. This spout 66 is supported through the opening J and from its mouth, which opens beneath practically the whole of the die bed 21, it slopes rearwardly and downwardly and terminates over a laterally extending conveyor belt 67.

The die bed and die have opening 68 and 69 for respectively passing the top and side portions 11 and 13 of each plate P which, when trimmed off by the die, are separated and fall through these openings down into the mouth of the chute.

The conveyor 63 has its lower drive roller 70 driven by a belt or chain 71 from the press crankshaft and in turn drives the roller 72 of the conveyer 67 through suitable connections 73. However, any other type of drive may obviously be employed for operating these conveyors. The waste or trimmings conveyor 67 as stated, runs out laterally, here shown as from a point beneath the floor 29 where it is supported by hangers 74, and conveys the trimmed frame portions of the plates P to a point of storage or transfer to the melting smelter (not shown) of the casting equipment.

In practice, the gears 30, 34 and 38, and connections 71 and 73 are also enclosed within guards not here shown for convenience in disclosure.

It is found that in the actual use of a machine such as here shown, the rough plates may be accurately trimmed and the operation may be carried out rapidly and continuously in accordance with the operation of other automatic machinery now used for casting, pasting and otherwise operating upon the plates.

An air blast may be arranged to blow small particles from the die as each plate is trimmed and automatic means, operated by a so-called electric eye, may be incorporated to stop the press should plates jam therein.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a grid plate trimming machine, a die and cooperating punch, the face of the die being disposed in an inclined plane, means for feeding grid plates to the die, said means engaging the upper corners of each plate, so that the plate will be suspended in vertical position, and then moving the plate downwardly upon an upper end part of the die face whereby said die face will tilt and guide the plate into face contact with itself.

2. In a grid plate trimming machine, a die and cooperating punch, the face of the die being disposed in an inclined plane, means for feeding grid plates to the die, said means engaging the upper corners of each plate, so that the plate will be suspended in vertical position, and then moving the plate downwardly upon an upper end part of the die face whereby said die face will tilt and guide the plate into face contact with itself, and means for releasing the upper corners of the plate from said feeding means.

3. In a grid plate trimming machine, a die and cooperating punch, the face of the die being disposed in an inclined plane, means for feeding grid plates to the die, said means engaging the upper corners of each plate, so that the plate will be suspended in vertical position, and then moving the plate downwardly upon an upper end part of the die face whereby said die face will tilt and guide the plate into face contact with itself, and means for releasing the upper corners of the plate from said feeding means after the lower edge of the plate has first made contact with the upper end of the die face.

4. In a grid plate trimming machine, a die and cooperating punch, the face of the die being disposed in an inclined plane, means for feeding grid plates to the die, said means engaging the upper corners of each plate, so that the plate will be suspended in vertical position, and then moving the plate downwardly upon an upper end part of the die face whereby said die face will tilt and guide the plate into face contact with itself, and means for disengaging the upper corneds of the plate from the feeding means and then guiding the upper end of the plate while the lower end is guided by the die face.

CARL L. FELDTKELLER.